(12) United States Patent
Hsu et al.

(10) Patent No.: US 7,076,622 B2
(45) Date of Patent: Jul. 11, 2006

(54) SYSTEM AND METHOD FOR DETECTING AND SHARING COMMON BLOCKS IN AN OBJECT STORAGE SYSTEM

(75) Inventors: Windsor Wee Sun Hsu, Sunnyvale, CA (US); Shauchi Ong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 10/674,375

(22) Filed: Sep. 30, 2003

(65) Prior Publication Data

US 2005/0071436 A1    Mar. 31, 2005

(51) Int. Cl.
*G06F 12/00* (2006.01)

(52) U.S. Cl. .................. 711/162; 709/214; 709/201; 711/170; 711/114

(58) Field of Classification Search ............. 711/162, 711/112, 114, 147, 170; 709/226, 224, 225, 709/201, 214, 217; 714/6
See application file for complete search history.

(56) References Cited

U.S. PATENT DOCUMENTS

| | | | | |
|---|---|---|---|---|
| 4,974,156 A * | 11/1990 | Harding et al. | ............. | 711/162 |
| 5,457,791 A | 10/1995 | Matsumoto et al. | | |
| 6,128,654 A * | 10/2000 | Runaldue et al. | ........... | 709/219 |
| 6,401,120 B1 * | 6/2002 | Gamache et al. | ........... | 709/226 |
| 6,728,831 B1 * | 4/2004 | Bridge | ....................... | 711/112 |
| 2002/0166026 A1 | 11/2002 | Ulrich et al. | | |
| 2002/0169934 A1 | 11/2002 | Krapp et al. | | |
| 2003/0037187 A1 | 2/2003 | Hinton et al. | | |
| 2004/0103254 A1 * | 5/2004 | Satoyama et al. | .......... | 711/162 |
| 2004/0145986 A1 * | 7/2004 | Taylor | ....................... | 369/53.1 |

OTHER PUBLICATIONS

Veritas Software Corp., "Veritas Volume Manager (V.times.VM) System Administrator's Guide, Release 2.3," Aug. 1996.*
Bernstein et al., "Replicated Data", Concurrency Control and Recovery in Database Systems, Chapter 8, Addison-Wesley Publishing Company, pp. 265-311 (1987).*
Liebeherr et al., "A Versatile Packet Multiplexer for Quality-of-Service Networks", Proceedings of the 4th IEEE International Symposium on High Performance Distributed Computing Systems, 1995.*
"Fips Pub 180-Secure Hash Standard", Federal Information Processing Standards Publication, US Dept. of Commerce/National Institute of Standards and Technology, May 11,1993, 5 pages.

(Continued)

*Primary Examiner*—Pierre-Michel Bataille
(74) *Attorney, Agent, or Firm*—Gibb I.P. Law Firm, LLC; Mark McCabe, Esq.

(57) ABSTRACT

A system and method of optimizing storage of common data blocks within a networked storage system comprises receiving a data block to be stored in the networked storage system, analyzing contents of the received data block to determine how many copies of the data block the system is entrusted to store and how many copies of the data block existing within the system, and to identify a location of each copy of the data block within the system, identifying performance and reliability requirements of the system, determining an optimal number of copies of the received data block to store in the system, wherein the determination is made according to a number of copies of the data block the system is entrusted to store together with the identified performance and reliability requirements of the system, and maintaining the optimal number of copies of the received data block within the system.

33 Claims, 7 Drawing Sheets

OTHER PUBLICATIONS

"Secure Hash Standard", Federal Information Processing Standards Publication 180-1, Apr. 17, 1995, 18 pages.

"Venti: a new approach to archival storage", Proceedings of the FAST 2002 Conference on File and Storage Technologies, USENIX, Monterey, CA, Jan. 28-30, 2002, 14 pages.

"Soft Updates: A solution to the metadata update problem in file systems", Gregory R. Ganger, Marshall Kirk McKusick, Craig A.N. Soules, Yale N. Patt, ACM Transactions on Computer Systems, vol. 18, No. 2, May 2000, pp. 127-153.

"A Universal Algorithm for Sequential Data Compression", Jacob Ziv, Abraham Lempel, IEEE Transactions on Information Technology Theory, vol. IT-23, No. 3, May 1977, pp. 337-343.

* cited by examiner

SYSTEM AND METHOD FOR DETECTING AND SHARING COMMON BLOCKS IN AN OBJECT STORAGE SYSTEM

BACKGROUND OF THE INVENTION

1. Field of the Invention

The invention generally relates to data storage within a storage area network, and more particularly to a read/write object storage system that manages data storage based on the information content across data blocks within the system.

2. Description of the Related Art

Within this application several publications are referenced by arabic numerals within parentheses. Full citations for these, and other publications may be found at the end of the specification immediately preceding the claims. The disclosures of all these publications in their entireties are hereby expressly incorporated by reference into the present application for the purposes of indicating the background of the present invention and illustrating the state of the art.

There are many copies of the same data in the world. For example, many PC users have duplicate copies of the same application, program, and data installed and stored on their computer. In addition, when email and attachments are forwarded, different users end up storing the same email and attachments. As computing and storage becomes more centralized, servers increasingly store the same data for many different users/organizations. Furthermore, many critical applications such as snapshot, time travel, data archival etc. require the system to maintain multiple copies of largely identical data. Although the different copies of a data object (e.g., file) may not be identical, many of the data blocks that make up the object are identical. Therefore, storage systems that blindly manage identical blocks would increasingly waste storage space and incur unnecessary cost to maintain the extra storage. An example of a typical file storage system is illustrated in FIG. 1, wherein the system contains a storage component 2 connected to a file allocation table (FAT) 3, which maps the name of a file (or file ID) to the locations (addresses) of the storage blocks belonging to that file. A free space map (FSM) 4 keeps track of the unallocated storage blocks, i.e., the storage blocks that do not belong to any file. Finally, read/write/create/delete operations 5 are used in conjunction with the system to manipulate the stored data.

One way to reduce the amount of storage consumed is to compress the data using an algorithm such as that described in Lempel-Ziv[1]. However, this conventional approach introduces additional complexity as the data objects and/or data blocks become variably sized. Furthermore, performance and reliability suffers as data has to be compressed when written and uncompressed when read. Moreover, such compression has limited effectiveness at reducing the storage taken up by duplicate data blocks because it is local in scope, exploiting only similar bit patterns that are near one another.

Another conventional technique that reduces storage consumption is copy-on-write. When a snapshot of a file system is taken with copy-on-write, no data blocks are actually copied. It is only when a block is updated that a copy is made of the block. The assumption here is that when a block is updated, it is different from the original block. However, copy-on-write techniques only reduce the likelihood of having multiple copies of the same data block for the same offset in different versions of a file.

There has also been some work on a write-once block storage system that identifies data blocks by a unique hash of the data[2]. The drawbacks with such a system include: (1) it does not allow data to be deleted; (2) it requires a new interface to identify data blocks by a hash value rather than the address where they are stored; (3) it offers poor performance because data blocks that are logically related (e.g., of the same file) may not be stored together; (4) it incurs substantial inline overhead in computing the hash; and (5) it is less reliable in the sense that the loss of a given block could impact a lot of user data because a block of data that occurs many times is stored only once.

An orthogonal approach to reducing the cost of storing data is to use less expensive storage devices. For example, this can be achieved with a hierarchical storage manager that pushes some of the less active (predicted) data onto cheaper and slower storage (e.g., tapes). However, such an approach entails a lot of complexity, and is cost-effective only on a large scale. Moreover, performance is very poor when the prediction of which data is less likely to be used is wrong, as can often be the case.

Another drawback of existing storage systems is that although they may contain many copies of the same data, they have no idea exactly how many copies there are or where all the copies are located. Therefore, when a given copy is lost due to hardware problems (e.g., media failure, which is especially a problem when low-cost desktop drives are used), the system may not be able to repair that copy even though there are many other identical copies of the data located elsewhere in the system. Moreover, conventional solutions rely on maintaining redundancy of all the blocks, which is very costly, rather than controlled redundancy of the actual data, which is what is really needed.

Therefore, there remains a need for a novel system and method to reliably store data in a compact and inexpensive manner, which allows the data to be accessed quickly, and which does not store unnecessary duplicates of the same data within the system.

SUMMARY OF THE INVENTION

In view of the foregoing, an embodiment of the invention provides a method of optimizing storage of common data blocks within a networked storage system and a program storage device implementing the method, which comprises receiving a data block to be stored in a networked storage system, analyzing contents of the received data block to determine how many copies of the data block the networked storage system is entrusted to store and how many copies of the data block exist within the networked storage system and to identify a location of each copy of the data block within the networked storage system, identifying performance and reliability requirements of the networked storage system, determining an optimal number of copies of the received data block to store in the networked storage system, wherein the determination is made according to the number of copies of the received data block the networked storage system is entrusted to store in combination with the identified performance and reliability requirements of the networked storage system, and maintaining the optimal number of copies of the received data block within the networked storage system. The method further comprises maintaining a record associated with each data block, wherein the record includes metadata specific to the data block for which the record is maintained. Moreover, maintaining the optimal number of copies includes recognizing that a copy of the data block is no longer accessible, finding a duplicate copy of the data block, and generating another copy of the data block in order to achieve the optimal number of copies. In a preferred embodiment, the number of copies of the data block that the networked storage system is entrusted to store is based on data received in the storage system during a preceding predetermined period of time.

Alternatively, the invention provides a method of optimizing storage of common data blocks within a networked storage system comprising identifying a data block within a storage area network (SAN), determining how many copies of the data block the SAN is entrusted to store, determining how many copies of the data block exist within the SAN, identifying performance and reliability requirements of the SAN, determining an optimal number of copies of the data block to store in the SAN according to a number of copies of the data block the SAN is entrusted to store in combination with the identified performance and reliability requirements of the SAN, and maintaining the optimal number of copies of the data block. The method further comprises maintaining a record associated with each data block, wherein the record includes metadata specific to the data block for which the record is maintained. Moreover, maintaining the optimal number of copies includes recognizing that a copy of the data block is no longer accessible, finding a duplicate copy of the data block, and generating another copy of the data block in order to achieve the optimal number of copies. Also, the number of copies of the data block that the SAN is entrusted to store is based on data received in the SAN during a preceding predetermined period of time.

In another embodiment of the invention, a storage system for optimizing storage of common data blocks within the storage system is provided comprising storage blocks comprising data, a file allocation table operable for matching a file identifier associated with a file to a location in the storage blocks allocated to the file, a free space map operable for tracking unallocated storage blocks, a redundancy management controller configured to the free space map and operable for maintaining an optimal number of copies of the data in the storage blocks, and an occurrence count determination controller configured to the redundancy management controller and operable for determining the occurrence count of the data in the storage blocks, wherein the occurrence count of the data in a storage block is defined as the number copies of the data the storage system is entrusted to store. The storage system further comprises a schedule control unit configured to the file allocation table and operable for scheduling operations of the occurrence count determination controller and the redundancy management controller at optimal times.

Moreover, the occurrence count determination controller is operable for determining an occurrence count of a block of the data by entering the data into a block contents map. The file allocation table comprises a first data structure operable for mapping a file name to a file number, and a second data structure operable for mapping the file number to the data blocks associated with the file. Also, the free space map comprises a data structure that marks a unit of storage space in the storage block as being allocated or unallocated. Furthermore, the occurrence count is based on data received in the storage system during a preceding predetermined period of time. The block contents map is operable for mapping a block of the data to its possible locations in the storage system. Additionally, the occurrence count determination controller is operable for determining an occurrence count of a block of the data by entering the data into the block contents map, wherein the block contents map comprises a hash table, and wherein each entry of the data into the block contents map corresponds to a unique block of data in the system and comprises an occurrence count for the block of data, locations of data blocks where the data is stored, and a file identifier for files containing the block of data.

The redundancy management controller determines the amount of copies of data to maintain based on a combination of the occurrence count for the block of data, performance settings of the storage system, reliability settings of the storage system, and attributes of the files. The storage system further comprises a reverse block contents map, wherein the reverse block contents map is operable for mapping an address of the storage block to its corresponding block contents map entry.

Moreover, the schedule control unit schedules operations of the occurrence count determination controller and the redundancy management controller to be performed inline. Alternatively, the schedule control unit schedules operations of the occurrence count determination controller and the redundancy management controller to be performed offline at convenient times to reduce interference with the processing of read/write/create/delete operations received by the storage system.

Moreover, the storage blocks in the storage system comprise data blocks each belonging to a single location in a single file. Alternatively, the storage blocks in the storage system comprise data blocks each belonging to one or more locations in one or more files. Still alternatively, the storage blocks in the storage system comprise unallocated storage blocks.

There are several benefits of the invention. For example, the system and method provided by the invention drastically reduce storage cost by maintaining an optimal number of copies of each data block based on its occurrence count and the performance and reliability requirements. The system is also more reliable because a failure of any copy of a data block can be repaired by using one of the other copies of the data block. In addition, the system performs well by being able to satisfy requests for a data block using any of the copies of the data block and because the system largely maintains the logical relationships of blocks in their physical layout. Moreover, when the same data blocks are stored, the system requires fewer disk writes. By reducing the number of copies of a data block, the invention also improves the effectiveness of any caching by the underlying storage system. Additionally, when the operations of the occurrence count determination controller and the redundancy management controller occur in the background, the invention potentially reduces the amount of data that must be processed (because many files have short life times), and reduce the impact on foreground performance.

These, and other aspects of invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which:

FIG. 3(*b*) is a flow diagram illustrating a preferred method of the invention;

FIG. 3(*c*) is a flow diagram illustrating an alternative method of the invention;

FIG. 3(*d*) is a flow diagram illustrating an alternative method of the invention.

DETAILED DESCRIPTION OF PREFERRED EMBODIMENTS OF THE INVENTION

Figure 1:
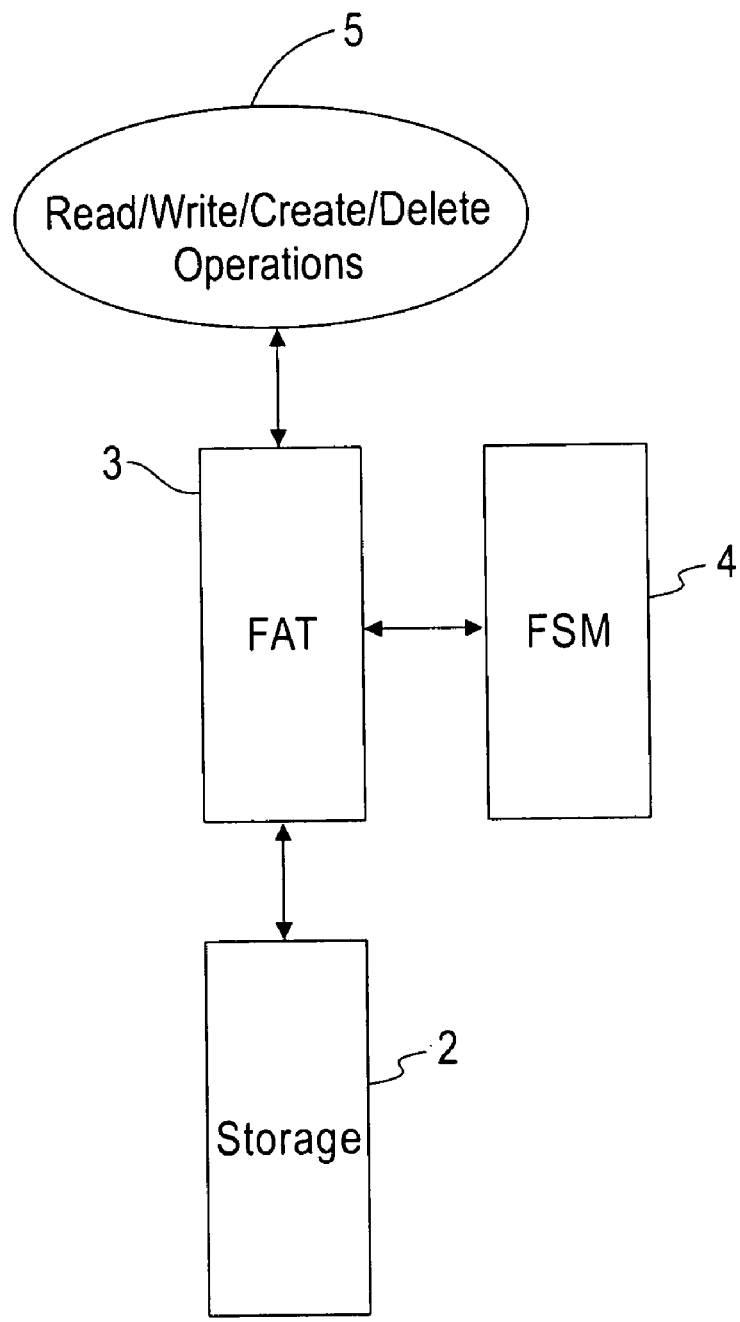
FIG. 1 is a schematic diagram of a conventional file storage system.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As mentioned, because storage systems manage data on the basis of the containers that store the data (e.g., storage blocks), the exact same data could be in multiple blocks but the systems would be unaware of the fact, and would be unable to exploit the fact for cost savings, performance improvement, and reliability enhancement. As such, the invention provides an object storage system (e.g., file system) that manages data storage based on the information content across the blocks. The invention determines which are the unique blocks of data, and stores a variable number of copies of such blocks to achieve, at low cost, the desired levels of performance and fault-tolerance.

Figure 2:
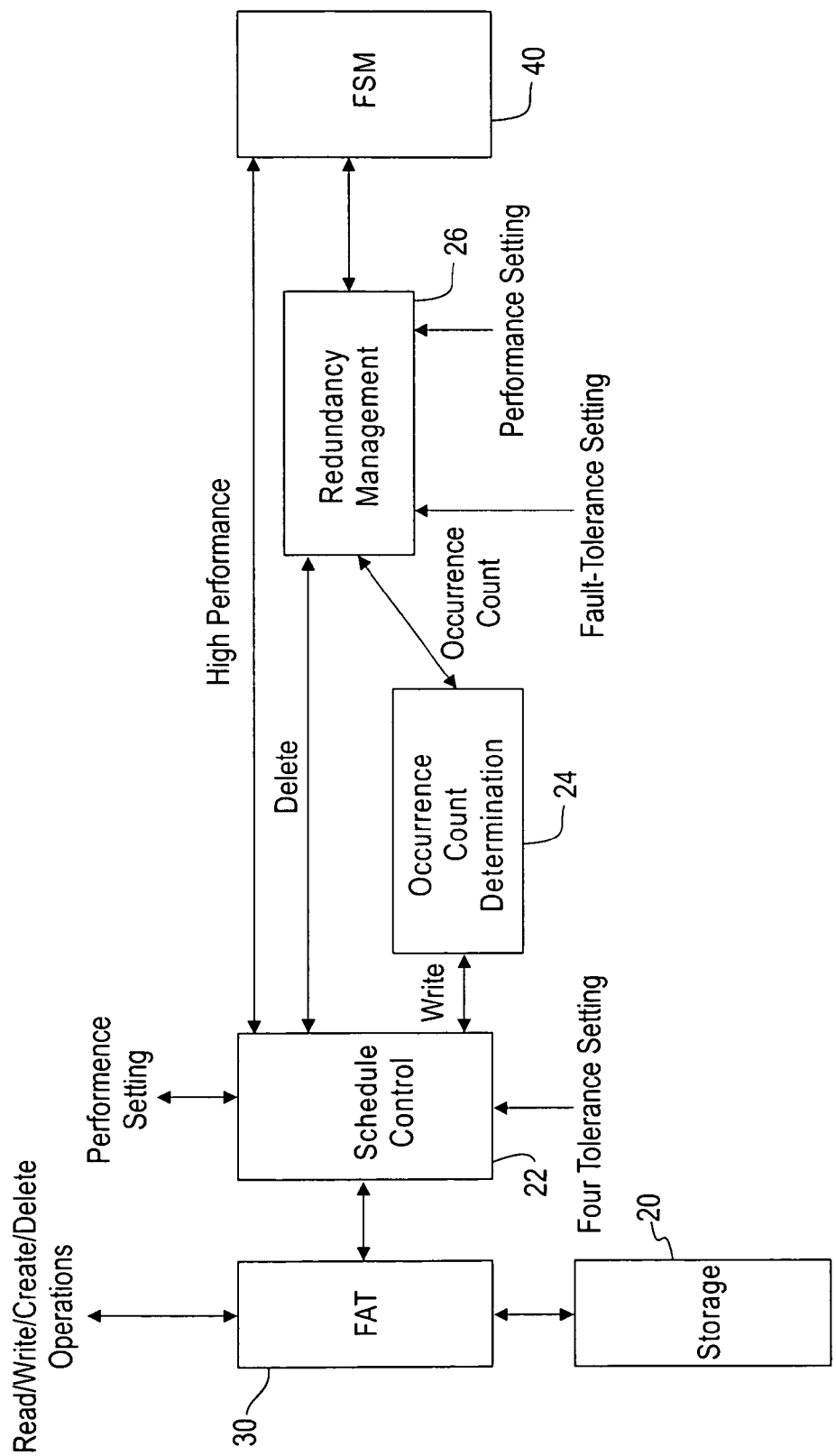
FIG. 2 is a schematic diagram of a file storage system according to the invention.
Figure 3A:
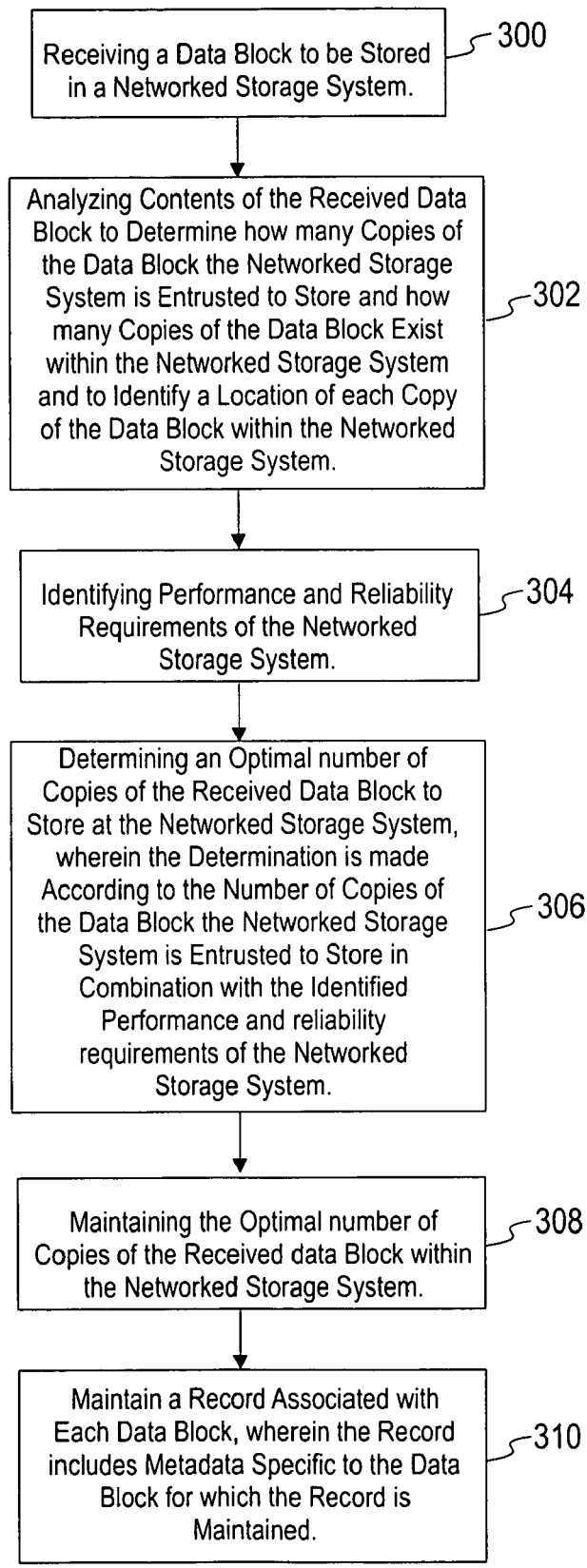
FIG. 3(*a*) is a flow diagram illustrating a preferred method of the invention.
Figure 3B:
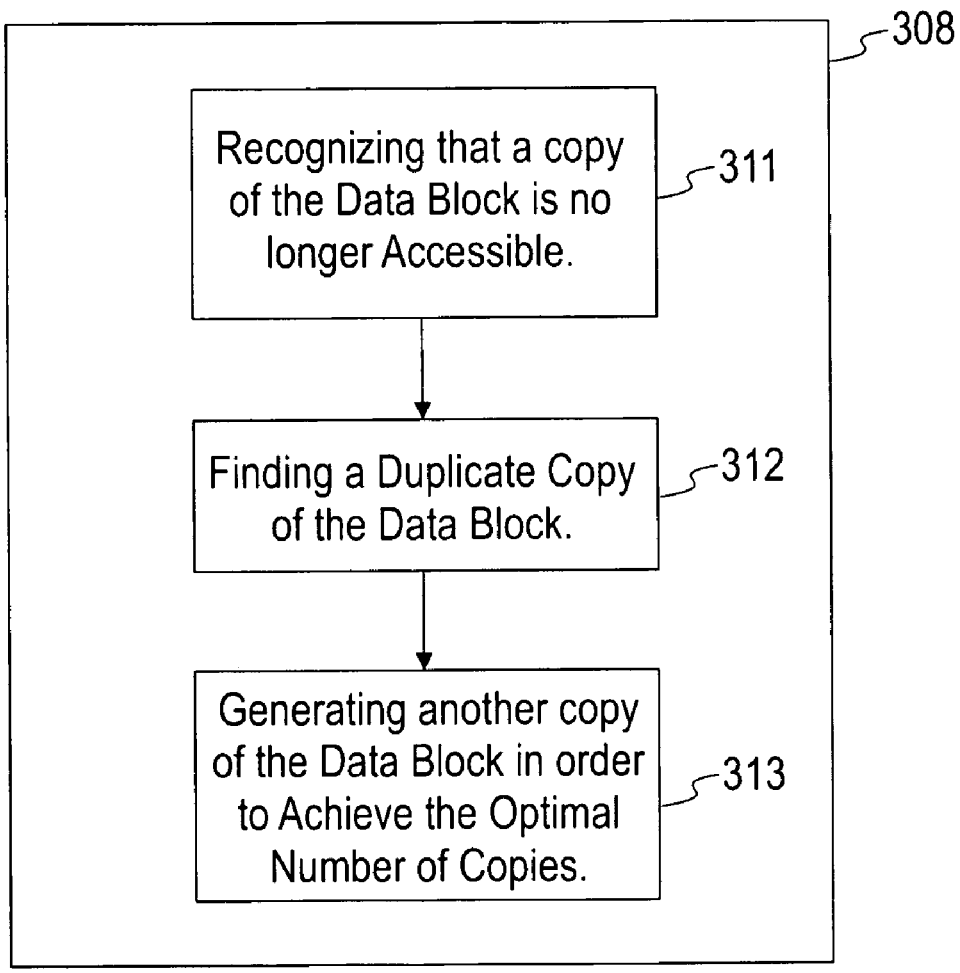
Figure 3C:
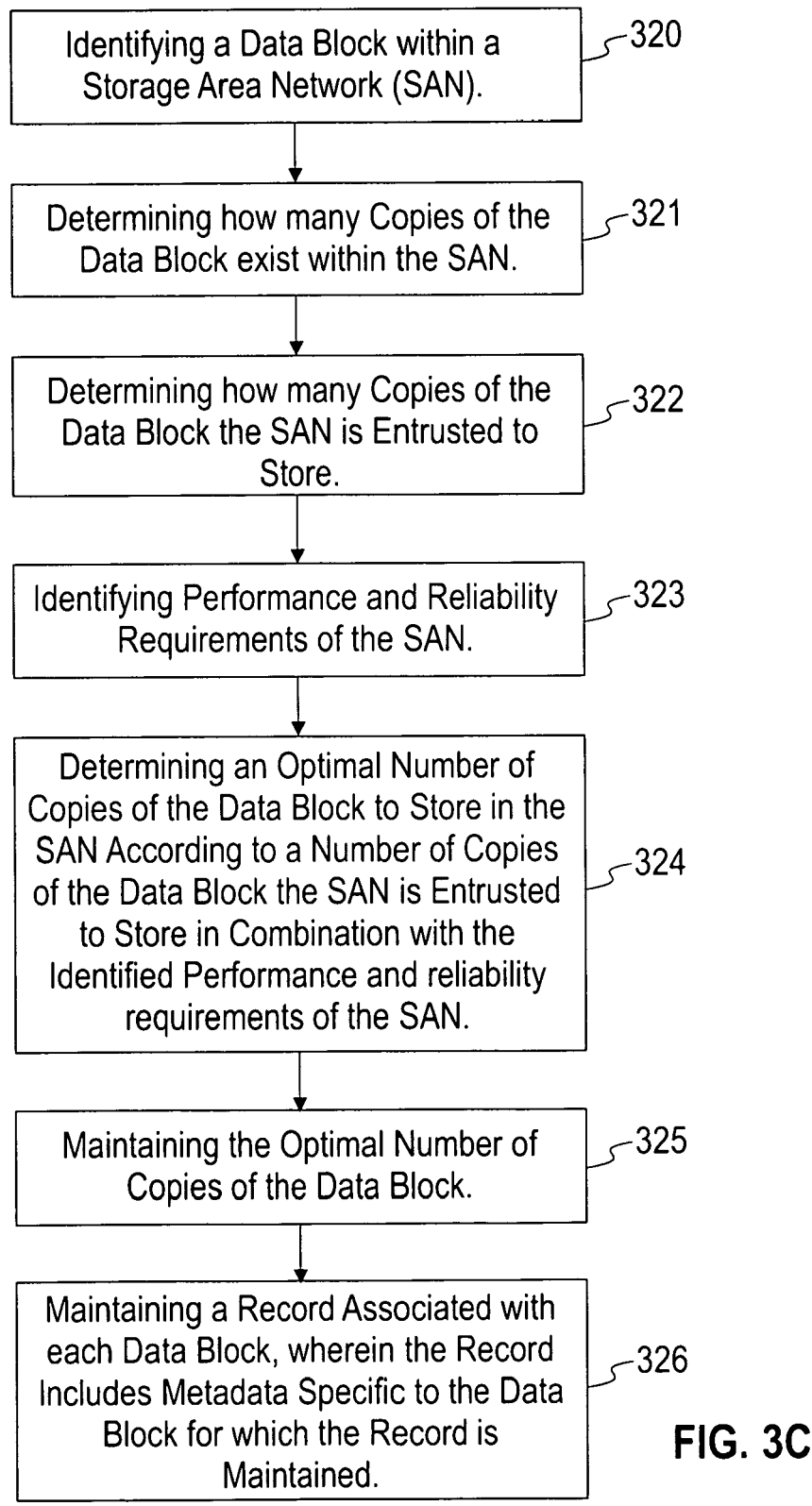
Figure 3D:
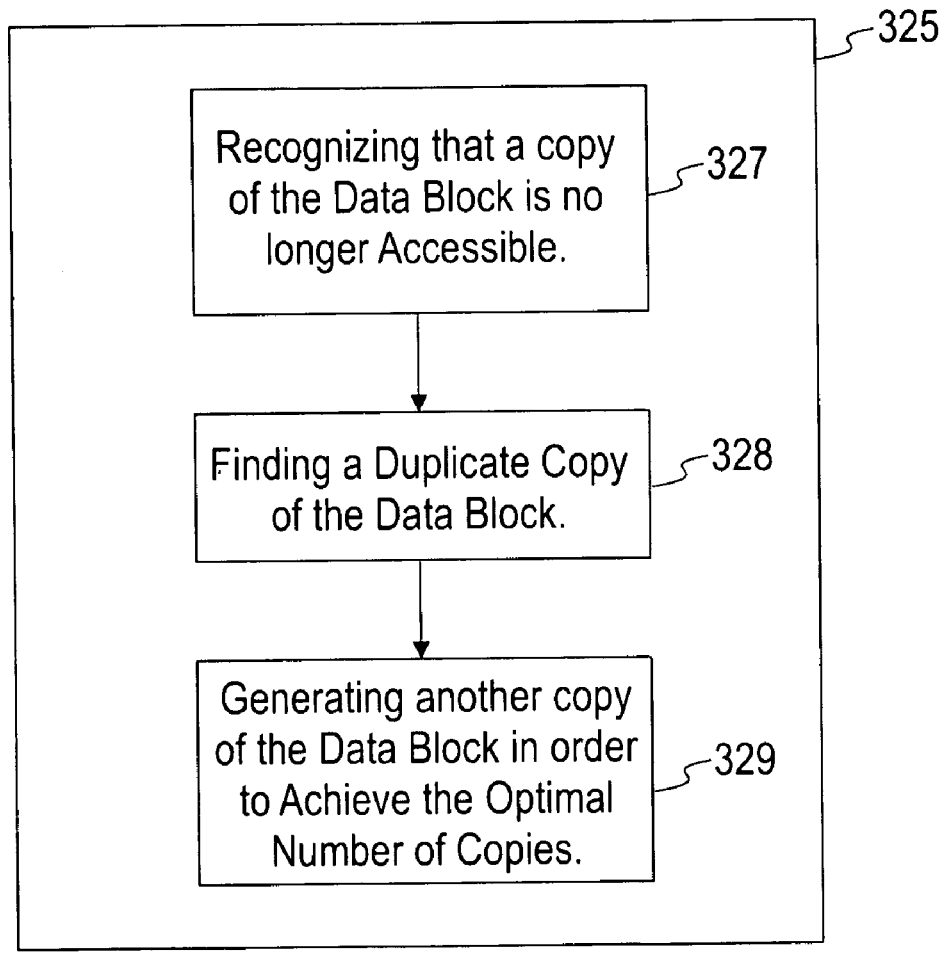
Figure 4:
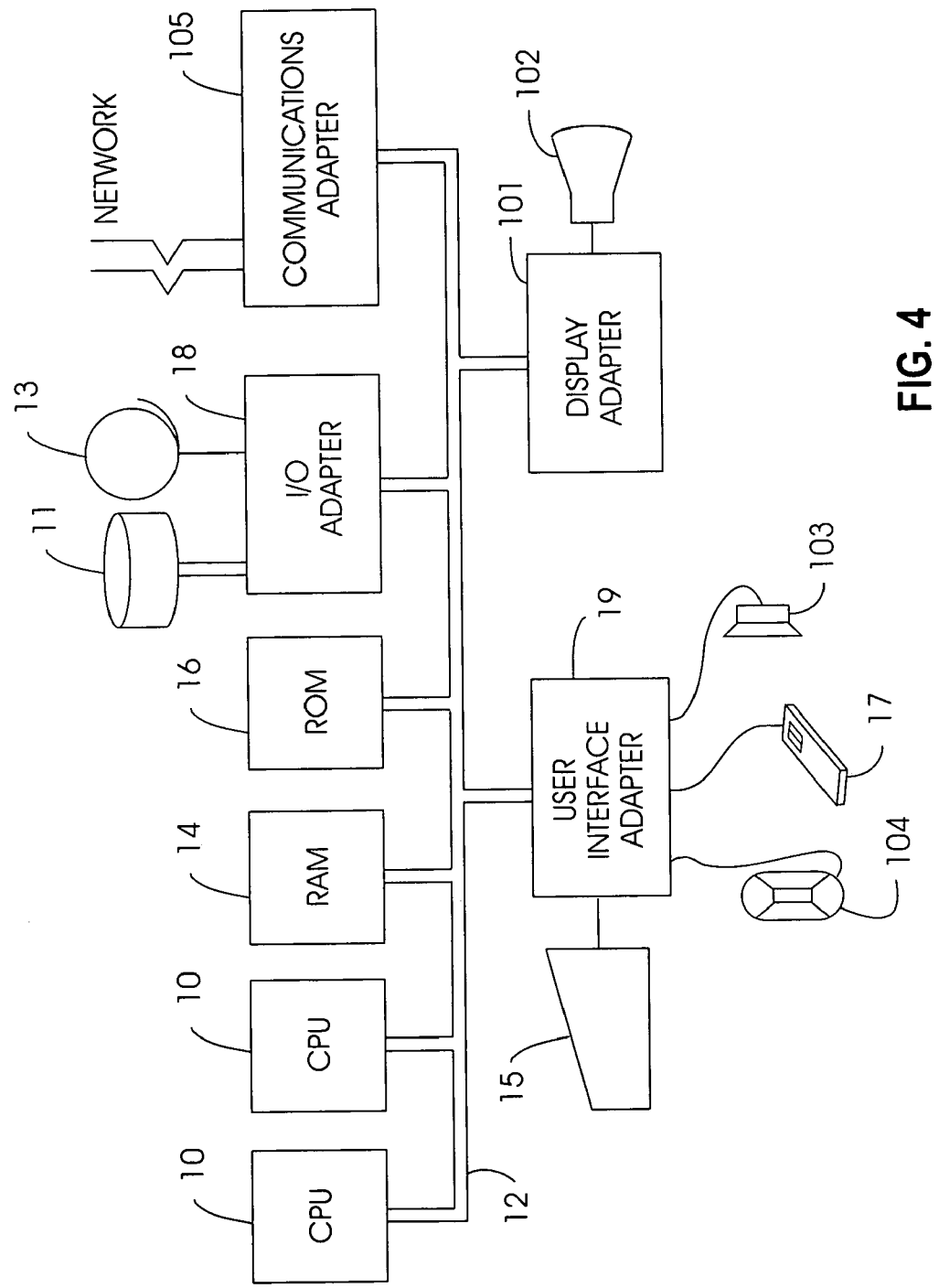
FIG. 4 is a system diagram according to the invention.

Referring now to the drawings, and more particularly to FIGS. 2 through 4, there are shown preferred embodiments of the invention. The invention uses files in a file system with disks or an array of disks as the storage medium. But those skilled in the art should appreciate that the same idea applies to any groupings of data such as objects in an object disk, and to other forms of storage such as tapes, compact disks (CDs), MEMS-based storage, and combinations of such.

As illustrated in FIG. 2, the invention provides a data storage unit 20, a file allocation table (FAT) 30, a free space map (FSM) 40, as well as additional functions/components, such as an occurrence count determination controller 24, a redundancy management controller 26, and a schedule control unit 22 configured together. The functions of these components as well as the other functions shown in FIG. 2 are described in turn.

The file allocation table (FAT) 30 maps the name of a file to the locations (addresses) of the storage blocks belonging to that file. Preferably, the FAT 30 may be composed of two data structures: one that maps the file name to a file number (e.g., inode number), and the second that maps the file number to the block locations and other attributes of the file. The free space map (FSM) 40 keeps track of the unallocated storage blocks, i.e., the storage blocks that do not belong to any file. This is preferably implemented as a bitmap where each allocatable unit of storage space called a storage block has a corresponding bit that marks the block as being allocated or unallocated.

The file system operations that relate directly to the embodiments of the invention are file create, file write, file read, and file delete. Preferably, these operations involve authenticating the user and checking the access permissions. For file create operations, a new entry is simply added to the FAT 30.

For file write operations, i.e., when a block of data is written to the file system, the system first determines the number of copies of that block of data the file system has already been entrusted to store. This is the occurrence count for that block of data. Based on the occurrence count, and the performance and reliability settings, the system then decides how many copies of that data it should maintain. If it currently has fewer than the desired number of copies of the data, the system proceeds to create a new copy of the data, or it logs this action to be performed later. Creating a new copy of the data involves getting a free storage block from the FSM 40, and writing the data to that storage block. If the system already has the desired number of copies of the data, it selects one of the existing copies of the data. In either case, the FAT 30 is updated to include a reference to the created/selected copy of the data.

The process of determining the occurrence count, and managing the desired number of copies of each unique block of data can be performed inline or deferred until a later convenient time. In the latter case, the system handles the file write operation as in a traditional file system, and reads the block back later for processing. More generally, the schedule control keeps track of which files have to be processed, and decides when to process them. Moreover, a file may be reprocessed when the performance and/or reliability settings of the system are changed.

For each unique block of data, the system keeps track of its occurrence count, and the storage blocks that contain that block of data and vice versa. For each of these storage blocks, the system maintains the number of times that block is referred to by the FAT 30, and the IDs of the files that have references to it.

For file delete operations, the FAT 30 is used to find all the storage blocks belonging to the file to be deleted. The reference count for each of these storage blocks is decremented by the number of references to that block by the current file. When the count reaches zero, that storage block is allocated and the FSM 40 is updated accordingly. The FAT entry corresponding to that file is then removed. As a final step, the system reevaluates the desired number of copies for each block of data that has been affected, rebalancing the number of references to each copy of the block if necessary. Moreover, the system could also log this action to be performed later.

For file read operations, the system identifies the FAT 30 to determine the address of the requested data. Thereafter, the system proceeds to read the blocks from the disk 20.

When a read error is encountered for a storage block, the system determines if there is another copy of the data in that storage block somewhere else in the storage system 20. If there is a duplicate copy, the system reads one of the other copies to satisfy the current read request. It then marks the error block as bad in the FSM 40, and proceeds to repair the system by going through the FAT entries for the files with references to the error copy and changing these references to point to one of the other copies. As a final step, which can again be deferred to a later time, the system reevaluates the desired number of copies for that block of data, creating a new copy and rebalancing the references if necessary.

With regard to the occurrence count determination controller 24, the system determines the occurrence count of a block of data by hashing the data into a hash table (block contents map (BCM)). Each entry in the BCM corresponds to a unique block of data, and contains the occurrence count for that block of data, the locations of the storage blocks where it is stored, and for each of these storage blocks, the number of times that block is referred to by the FAT 30, and the IDs of the files that have references to it. A file may contain the same block of data multiple times so the occurrence count can be larger than the number of files containing that block of data. Furthermore, different blocks of data may hash to the same key resulting in what are commonly called collisions. To find the BCM entry corresponding to a given block of data, the system computes the hash value for that data, follows the chain of entries for data blocks with that hash value, reads the corresponding storage blocks, and compares them with the given block of data to see if there is a match. If a cryptographic hash function is used, the chances for different blocks of data to hash to the same value is practically zero, thus the system can elect to skip the block read and compare. In order to support the delete and read error recovery functions, the system also maintains the reverse BCM (rBCM), which simply maps the address of a storage block to its BCM entry.

Because data usage tends to exhibit temporal locality, any duplicate data blocks are likely to occur close together in time. In a preferred embodiment of the invention, the occurrence count is determined based on data that has been received for storage by the file system during a preceding predetermined period of time such as a week or a month, etc. In another embodiment, information maintained in the BCM and rBCM are aged out so that these tables contain only the information pertaining to data blocks entrusted to the file system for storage during a preceding predetermined period of time. In yet another embodiment, the BCM and rBCMs have a predetermined maximum size and the oldest information in the tables are removed whenever the tables exceed their maximum size. Aging the information in the BCM and rBCM greatly reduces the size of these tables without significantly affecting the benefits of the disclosed system and method.

The data contained in each of the FAT, FSM, BCM, and rBCM are generally referred to as metadata. Techniques for keeping the metadata consistent and/or bringing them back into consistency after some failure are well-known and include synchronous write of metadata to stable storage, logging, soft updates, etc.[3]

The redundancy management controller 26 is operable in the following manner. As mentioned above, because disks and other storage media can and do fail, there is a need to maintain multiple independent copies of the data. While the conventional systems provide block redundancy, those systems do not care what data is stored in the blocks; every block is made redundant. Such a blind approach is very inefficient when the system contains multiple copies of the same data, as is increasingly the case. By focusing on the information content across blocks, the system provided by the invention manages the degree of data redundancy to achieve higher levels of fault tolerance at a lower cost. For each unique block of data (as opposed to block of storage), the system decides how many copies to maintain based on a combination of the occurrence count of the data, performance and reliability settings, type of file, etc.

In a traditional file system, the same data could be stored multiple times but there is no way to know where the other copies are. Therefore, if a storage block cannot be read, the conventional system could lose that block of data even though there are other copies of the data located elsewhere in the system. In contrast, the invention provides a system that knows whether there are any other identical copies of a given block of data and where each of the copies is located. When a storage block cannot be read, the system is able to recover from the error as described earlier.

A mapping or virtualization layer is used to locate where the multiple copies of a block of data are. This mapping can be inserted into the I/O path just above the storage system 20 in which case the system can decide dynamically which copy of a block of data to use. In the preferred embodiment of the invention, the mapping is restricted to go on the I/O path and is used only when updating the FAT 30. Such an embodiment adds nothing to the I/O path and therefore has no adverse impact on read performance.

Additionally, storage blocks may have correlated failures. For instance, when a disk crashes, all the storage blocks on the disk fail together. It is preferred that the underlying storage system exports its failure boundaries so that the system can place the copies of a given block of data in independent failure domains. Moreover, one or more of the copies could be on a slower form of storage such as tape and remote storage for backup and disaster recovery.

The level of redundancy also affects performance. A more sophisticated implementation keeps statistics on the degree of fragmentation for each file. If a file is fragmented beyond some threshold, which can vary with the type of file and/or specific user/administrator setting, the system stops trying to use existing copies of the data but instead creates a new copy of the data.

With regard to the schedule control unit 22, determining the occurrence count and managing the data redundancy can be a costly process. Therefore, in a preferred embodiment, the system selectively defers this process to a more convenient time. As such, the system provided by the invention has different modes, which are set dynamically by one or more of a user, administrator, and system management software. When the focus of the system is on storage-saving and high reliability, it performs the process of determining the occurrence count and managing the data redundancy inline. When the system is focused on performance, it performs all of the file writes without checking whether the data blocks to be written already exist in system; it simply assumes that all the data blocks are new. When the system is in the balanced mode, it behaves as though it is in the performance mode. However, periodically and/or when the system is relatively idle and/or when storage space is low and/or when instructed by the user/administrator, it reads the blocks back to perform the process of determining the occurrence count and managing the data redundancy. Moreover, the system provided by the invention keeps track of which files have to be processed or reprocessed (e.g., when settings change, files are deleted, read error occurs). Also, the choice of which files to process next can be further made based on the likelihood that the file would be kept for a long time. Such predictions are made by keeping additional statistics on how the files are used. Because many files have short life times, deferring their processing could significantly reduce the amount of data that have to be processed.

According to the invention, the storage blocks are categorized into three pools: the common pool, private pool, and unallocated pool. The common pool comprises storage blocks that may belong to one or more locations in one or more files. The private pool comprises storage blocks that belong to exactly one location in exactly one file. The unallocated (free) pool comprises storage blocks that are not allocated. During a file delete operation, a block in the private pool can be returned to the free pool immediately. A block in the common pool can be returned to the free pool only if the block is not used elsewhere in the file or in another file.

A method of the invention is illustrated in FIG. 3(a). The method of optimizing storage of common data blocks within a networked storage system comprises receiving 300 a data block to be stored in a networked storage system, analyzing 302 contents of the received data block to determine how many copies of the data block the networked storage system is entrusted to store and how many copies of the data block exist within the networked storage system and to identify a location of each copy of the data block within the networked storage system, identifying 304 performance and reliability requirements of the networked storage system, determining 306 an optimal number of copies of the received data block to store at the networked storage system, wherein the determination is made according to the number of copies of the data block the networked storage system is entrusted to store in combination with the identified performance and reliability requirements of the networked storage system, and maintaining 308 the optimal number of copies of the received data block within the networked storage system. The method further comprises maintaining 310 a record associated with each data block, wherein the record includes metadata specific to the data block for which the record is maintained.

Moreover, as illustrated in FIG. 3(b), the step 308 of maintaining the optimal number of copies includes recognizing 311 that a copy of the data block is no longer accessible, finding 312 a duplicate copy of the data block, and generating 313 another copy of the data block in order to achieve the optimal number of copies.

Alternatively, as illustrated in FIG. 3(c), a method of optimizing storage of common data blocks within a networked storage system comprises identifying 320 a data block within a storage area network (SAN), determining 321 how many copies of the data block exist within the SAN, determining 322 how many copies of the data block the SAN is entrusted to store, identifying 323 performance and reliability requirements of the SAN, determining 324 an optimal number of copies of the data block to store in the SAN according to a number of copies of the data block the SAN is entrusted to store in combination with the identified performance and reliability requirements of the SAN, and maintaining 325 the optimal number of copies of the data block. The method further comprises maintaining 326 a record associated with each data block, wherein the record includes metadata specific to the data block for which the record is maintained.

Moreover, as illustrated in FIG. 3(d), the step 325 of maintaining the optimal number of copies includes recognizing 327 that a copy of the data block is no longer accessible, finding 328 a duplicate copy of the data block, and generating 333 another copy of the data block in order to achieve the optimal number of copies.

A representative hardware environment for practicing the present invention is depicted in FIG. 4, which illustrates a typical hardware configuration of an information handling/computer system in accordance with the present invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network, and display adapter 101 for connecting bus 12 to display device 102. A program storage device readable by the disk or tape units is used to load the instructions, which operate the invention, which is loaded onto the computer system.

It should be apparent to those skilled in the art that metadata can be stored in files, in which case the benefits of the invention also apply to the metadata. It should also be apparent that the invention does not preclude the additional use of compression techniques such as the Lempel-Ziv technique on the data, nor the use of file/block layout optimizations such as the log-structured file system and defragmentation, nor the imposition of regulations on which files can be deleted and when (e.g., several years after creation).

There are several benefits of the invention. For example the system and method provided by the invention drastically reduce storage cost by maintaining an optimal number of copies of each data block based on its occurrence count and the performance and reliability requirements. The system is also more reliable because a failure of any copy of a data block can be repaired by using one of the other copies of the data block. In addition, the system performs well by being able to satisfy requests for a data block using any of the copies of the data block and because the system largely maintains the logical relationships of blocks in their physical layout. Moreover, when the same data blocks are stored, the system requires fewer disk writes. By reducing the number of copies of a data block, the invention also improves the effectiveness of any caching by the underlying storage system. Additionally, when the operations of the occurrence count determination controller and the redundancy management controller occur in the background, the invention potentially reduces the amount of data that must be processed (because many files have short life times), and reduce the impact on foreground performance.

While the invention has been described in terms of preferred embodiments, those skilled in the art will recognize that the invention can be practiced with modification within the spirit and scope of the appended claims.

REFERENCES

[1] J. Ziv and A. Lempel, "A universal algorithm for sequential data compression," *IEEE Transactions on Information Theory*, IT-23, pp. 337–343, May 1977.

[2] National Institute of Standards and Technology, FIPS 180-1, *Secure Hash Standard*, US Department of Commerce, April 1995.

[3] G. R. Ganger, M. K. McKusick, C. A. N. Soules, and Y. N. Patt, "Soft updates: a solution to the metadata update problem in file systems," *ACM Transactions on Computer Systems*, 18, 2, pp. 127–153, May 2000.

What is claimed is:

1. A method of optimizing storage of common data blocks within a networked storage system, said method comprising:

receiving a data block to be stored in a networked storage system;

analyzing contents of a received data block to determine a number of copies of the data block the networked storage system is entrusted to store and a number of copies of the data block existing within the networked storage system, and to identify a location of each copy of the data block within the networked storage system;

identifying performance and reliability requirements of the networked storage system;

determining an optimal number of copies of the received data block to store in the networked storage system, wherein the determining is made according to the number of copies of the data block the networked storage system is entrusted to store in combination with the identified performance and reliability requirements of the networked storage system; and maintaining the optimal number of copies of the received data block within the networked storage system.

2. The method of claim 1, further comprising maintaining a record associated with each data block, wherein the record includes metadata specific to the data block for which the record is maintained.

3. The method of claim 1, wherein maintaining the optimal number of copies includes recognizing that a copy of the data block is no longer accessible, finding a duplicate copy of the data block, and generating another copy of the data block in order to achieve the optimal number of copies.

4. The method of claim 1, wherein the number of copies of the data block is based on data received in the networked storage system during a preceding predetermined period of time.

5. A method of optimizing storage of common data blocks within a networked storage system, said method comprising:

identifying a data block within a storage area network (SAN);

determining a number of copies of the data block existing within the SAN;

determining a number of copies of the data block the SAN is entrusted to store;

identifying performance and reliability requirements of the SAN;

determining an optimal number of copies of the data block to store in the SAN according to the number of copies of the data block the SAN is entrusted to store in combination with the identified performance and reliability requirements of the SAN; and maintaining the optimal number of copies of the data block.

6. The method of claim 5, further comprising maintaining a record associated with each data block, wherein the record includes metadata specific to the data block for which the record is maintained.

7. The method of claim 5, wherein maintaining the optimal number of copies includes recognizing that a copy of the data block is no longer accessible, finding a duplicate copy of the data block, and generating another copy of the data block in order to achieve the optimal number of copies.

8. The method of claim 5, wherein the number of copies of the data block is based on data received in the SAN during a preceding predetermined period of time.

9. A storage system for optimizing storage of common data blocks within said storage system comprising:

storage blocks comprising data;

a file allocation table configured to the storage blocks and operable for matching a file identifier associated with a file to a location in the storage blocks allocated to the file;

a free space map operable for tracking unallocated storage blocks;

a redundancy management controller configured to the free space map and operable for maintaining an optimal number of copies of the data in the storage blocks; and an occurrence count determination controller configured to the redundancy management controller and operable for determining a number of copies of the data in the storage blocks the storage system is entrusted to store.

10. The storage system of claim 9, further comprising a schedule control unit configured to the file allocation table and operable for scheduling operations of the occurrence count determination controller and the redundancy management controller at optimal times.

11. The storage system of claim 9, wherein the occurrence count determination controller is operable for determining an occurrence count of a block of the data by entering the data into a block contents map.

12. The storage system of claim 9, wherein the file allocation table comprises:

a first data structure operable for mapping a file name to a file number; and a second data structure operable for mapping the file number to the storage blocks associated with the file.

13. The storage system of claim 9, wherein the free space map comprises a bitmap that marks a storage block as being allocated or unallocated.

14. The storage system of claim 9, wherein the number of copies of the storage blocks is based on data received in the storage system during a preceding predetermined period of time.

15. The storage system of claim 11, wherein the block contents map is operable for mapping the block of data to its possible locations in the storage system.

16. The storage system of claim 11, wherein the block contents map comprises a hash table.

17. The storage system of claim 11, wherein each entry of the data in the block contents map corresponds to a unique block of data in the system and comprises:

an occurrence count for the block of data;

locations of storage blocks where the data is stored; and for each of the storage blocks, file identifiers for files that have references to it and a number corresponding to the references.

18. The storage system of claim 17, wherein the redundancy management controller determines an amount of copies of the data to maintain based on a combination of the occurrence count for the block of data, performance settings of the storage system, reliability settings of the storage system, and attributes of the files.

19. The storage system of claim 11, further comprising a reverse block contents map, wherein the reverse block contents map is operable for mapping an address of the storage block to its corresponding block contents map entry.

20. The storage system of claim 10, wherein the schedule control unit schedules operations of the occurrence count determination controller and the redundancy management controller to be performed inline.

21. The storage system of claim 10, wherein the schedule control unit schedules operations of the occurrence count determination controller and the redundancy management controller to be performed offline at a time which reduces interference with processing of system operations comprising read, write, create, and delete operations received by the storage system.

22. The storage system of claim 9, wherein the storage blocks comprise data blocks each belonging to a single location in a single file.

23. The storage system of claim 9, wherein the storage blocks comprise data blocks each belonging to at least one location in at least one file.

24. The storage system of claim 9, wherein the storage blocks comprise unallocated storage blocks.

25. A networked storage system for optimizing storage of common data blocks within said networked storage system comprising:
- means for identifying a data block within a storage area network (SAN);
- means for determining a number of copies of the data block existing within the SAN;
- means for determining a number of copies of the data block the SAN is entrusted to store;
- means for identifying performance and reliability requirements of the SAN;
- means for determining an optimal number of copies of the data block to store in the SAN according to the number of copies of the data block the SAN is entrusted to store in combination with the identified performance and reliability requirements of the SAN; and
- means for maintaining the optimal number of copies of the data block.

26. A program storage device readable by computer, tangibly embodying a program of instructions executable by said computer to perform a method of optimizing storage of common data blocks within a networked storage system, the method comprising:
- receiving a data block to be stored in a networked storage system;
- analyzing contents of a received data block to determine a number of copies of the data block the networked storage system is entrusted to store and a number of copies of the data block existing within the networked storage system, and to identify a location of each copy of the data block within the networked storage system;
- identifying performance and reliability requirements of the networked storage system;
- determining an optimal number of copies of the received data block to store in the networked storage system, wherein said determining is made according to the number of copies of the data block the networked storage system is entrusted to store in combination with the identified performance and reliability requirements of the networked storage system; and
- maintaining the optimal number of copies of the received data block within the networked storage system.

27. The program storage device of claim 26, further comprising maintaining a record associated with each data block, wherein the record includes metadata specific to the data block for which the record is maintained.

28. The program storage device of claim 26, wherein maintaining the optimal number of copies includes recognizing that a copy of the data block is no longer accessible, finding a duplicate copy of the data block, and generating another copy of the data block in order to achieve the optimal number of copies.

29. The program storage device of claim 26, wherein the number of copies of the data block is based on data received in the networked storage system during a preceding predetermined period of time.

30. A program storage device readable by computer, tangibly embodying a program of instructions executable by said computer to perform a method of optimizing storage of common data blocks within a networked storage system, the method comprising:
- identifying a data block within a storage area network (SAN);
- determining a number of copies of the data block existing within the SAN;
- determining a number of copies of the data block the SAN is entrusted to store;
- identifying performance and reliability requirements of the SAN;
- determining an optimal number of copies of the data block to store in the SAN according to the number of copies of the data block the SAN is entrusted to store in combination with the identified performance and reliability requirements of the SAN; and
- maintaining the optimal number of copies of the data block.

31. The program storage device of claim 30, further comprising maintaining a record associated with each data block, wherein the record includes metadata specific to the data block for which the record is maintained.

32. The program storage device of claim 30, wherein maintaining the optimal number of copies includes recognizing that a copy of the data block is no longer accessible, finding a duplicate copy of the data block, and generating another copy of the data block in order to achieve the optimal number of copies.

33. The program storage device of claim 30, wherein the number of copies of the data block is based on data received in the SAN during a preceding predetermined period of time.

* * * * *